US011455523B2

(12) United States Patent
Endoh

(10) Patent No.: US 11,455,523 B2
(45) Date of Patent: Sep. 27, 2022

(54) RISK EVALUATION METHOD, COMPUTER-READABLE RECORDING MEDIUM, AND INFORMATION PROCESSING APPARATUS

(71) Applicant: FUJITSU LIMITED, Kawasaki (JP)

(72) Inventor: Toshio Endoh, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 1163 days.

(21) Appl. No.: 15/987,391

(22) Filed: May 23, 2018

(65) Prior Publication Data
US 2018/0268295 A1    Sep. 20, 2018

Related U.S. Application Data

(63) Continuation of application No. PCT/JP2015/083425, filed on Nov. 27, 2015.

(51) Int. Cl.
*G06N 3/08*    (2006.01)
*G06N 3/04*    (2006.01)

(52) U.S. Cl.
CPC ................ *G06N 3/08* (2013.01); *G06N 3/04* (2013.01); *G06N 3/0454* (2013.01)

(58) Field of Classification Search
CPC .......... G06N 3/08; G06N 3/04; G06N 3/0454; G06N 3/02; G06N 3/082; G06N 20/00; G06N 20/10; G06N 20/20
See application file for complete search history.

(56) References Cited

U.S. PATENT DOCUMENTS

| 10,534,994 | B1* | 1/2020 | Kaul | G06N 3/0454 |
| 2012/0300980 | A1 | 11/2012 | Yokono | |
| 2014/0201126 | A1* | 7/2014 | Zadeh | A61B 5/165 |
| | | | | 706/52 |
| 2015/0324690 | A1* | 11/2015 | Chilimbi | G06N 3/063 |
| | | | | 706/27 |

FOREIGN PATENT DOCUMENTS

| JP | 6-168348 | 6/1994 |
| JP | 2003-157365 | 5/2003 |
| JP | 2012-243180 | 12/2012 |

OTHER PUBLICATIONS

Zhuang et al., "Supervised Representation Learning: Transfer Learning with Deep Autoencoders," 2015, Proceedings of the Twenty-Fourth International Joint Conference on Artificial Intelligence, pp. 4119-4125 (Year: 2015).*

(Continued)

*Primary Examiner* — Shane D Woolwine
(74) *Attorney, Agent, or Firm* — Staas & Halsey LLP

(57) ABSTRACT

A risk evaluation method is disclosed. A machine learning is conducted by using a neural network by inputting training data. A data distance corresponding to a permission level is calculated based on restoration data and the training data, the permission level being among a plurality of layers of the neural network, the restoration data being generated by using at least one weight of a plurality of permission level weights at the permission level, the plurality of permission level weights being among a plurality of weights of synapses at the plurality of layers, the plurality of weights being generated by the machine learning.

15 Claims, 16 Drawing Sheets

(56) References Cited

OTHER PUBLICATIONS

Lu et al., "Transfer learning using computational intelligence: A survey," 2015, Knowledge-Based Systems 80, pp. 14-23 (Year: 2015).*

Chetak Kandaswamy et al., "Improving Deep Neural Network Performance by Reusing Features Trained with Transductive Transference", In: "Medical image computing and computer assisted intervention-MICCAI 2015: $18^{th}$ international conference, Munich, Germany, Oct. 5-9, 2015; proceedings", 2014, pp. 265-272.

Extended European Search Report dated Nov. 2, 2018 in corresponding European Patent Application No. 15909311.1.

Jason Yosinski et al., "How transferable are features in deep neural networks?", In Advances in Neural Information Processing Systems 27, pp. 1-9, 2014.

Quoc V. Le et al., "Building High-level Features Using Large Scale Unsupervised Learning", In Proceedings of the $29^{th}$ International Conference on Machine Learning (ICML-12), 2012, pp. 8.

International Search Report dated Feb. 16, 2016 in corresponding International Patent Application No. PCT/JP2015/083425.

Japanese Patent Office English Abstract for Japanese Patent Publication No. 2003-157365, published May 30, 2003.

Japanese Patent Office English Abstract for Japanese Patent Publication No. 6-168348, published Jun. 14, 1994.

English Abstract for Japanese Patent Publication No. 2012-243180, published Dec. 10, 2012.

* cited by examiner

RISK EVALUATION METHOD, COMPUTER-READABLE RECORDING MEDIUM, AND INFORMATION PROCESSING APPARATUS

CROSS-REFERENCE TO RELATED APPLICATION

This application is a continuation application of International application PCT/JP2015/083425 filed on Nov. 27, 2015 and designated the U.S., the entire contents of which are incorporated herein by reference.

FIELD

The present invention is related to a risk evaluation method, a risk evaluation program, and an information processing apparatus.

BACKGROUND

A neural network is formed by multiple neurons and synapses connecting among those neurons. In a machine learning using the neural network, a learning result acquired as input training data is cumulatively stored as a weight to apply to each of the synapses.

Also, in the machine learning using the neural network, a technology called a transfer learning using the learning result by other training data has been known (for instance, refer to Non-Patent Document 1). The transfer learning, compared with a case of new learning, has an effect reaching the learning result with a lower error earlier. However, there is a risk (hereinafter, it is also called "restoration risk") in which the training data are restored to some extent from weights of synapses accumulated as learning results (for example, refer to Non-Patent Document 2).

RELATED-ART DOCUMENTS

Non-Patent Documents

Non-Patent Document 1: J. Yosinski, J. Clune, Y. Bengio and H. Lipson,"How transferable are features in deep neural networks?," In Advances in Neural Information Processing Systems 27, pp. 1-9, 2014.

Non-Patent Document 2: Le et al., "Building high-level features using large scale unsupervised learning," In Proceedings of the 29th International Conference on Machine Learning (ICML-12), 2012.

Patent Documents

Patent Document 1: Japanese Laid-Open Patent Publication No. 2003-157365.

Patent Document 2: Japanese Laid-Open Patent Publication No. H06-168348.

SUMMARY

According to one aspect of an embodiment, there is provision for a risk evaluation method performed by a computer that includes conducting machine learning using a neural network by inputting training data; calculating a data distance corresponding to a permission level based on restoration data and the training data, the permission level being among a plurality of layers of the neural network, the restoration data being generated by using at least one weight of a plurality of permission level weights at the permission level, the plurality of permission level weights being among a plurality of weights of synapses at the plurality of layers, the plurality of weights being generated by the machine learning.

The object and advantages of the invention will be realized and attained by means of the elements and combinations particularly pointed out in the appended claims.

It is to be understood that both the foregoing general description and the following detailed description are exemplary and explanatory and are not restrictive of the invention as claimed.

DESCRIPTION OF EMBODIMENT

Figure 1:
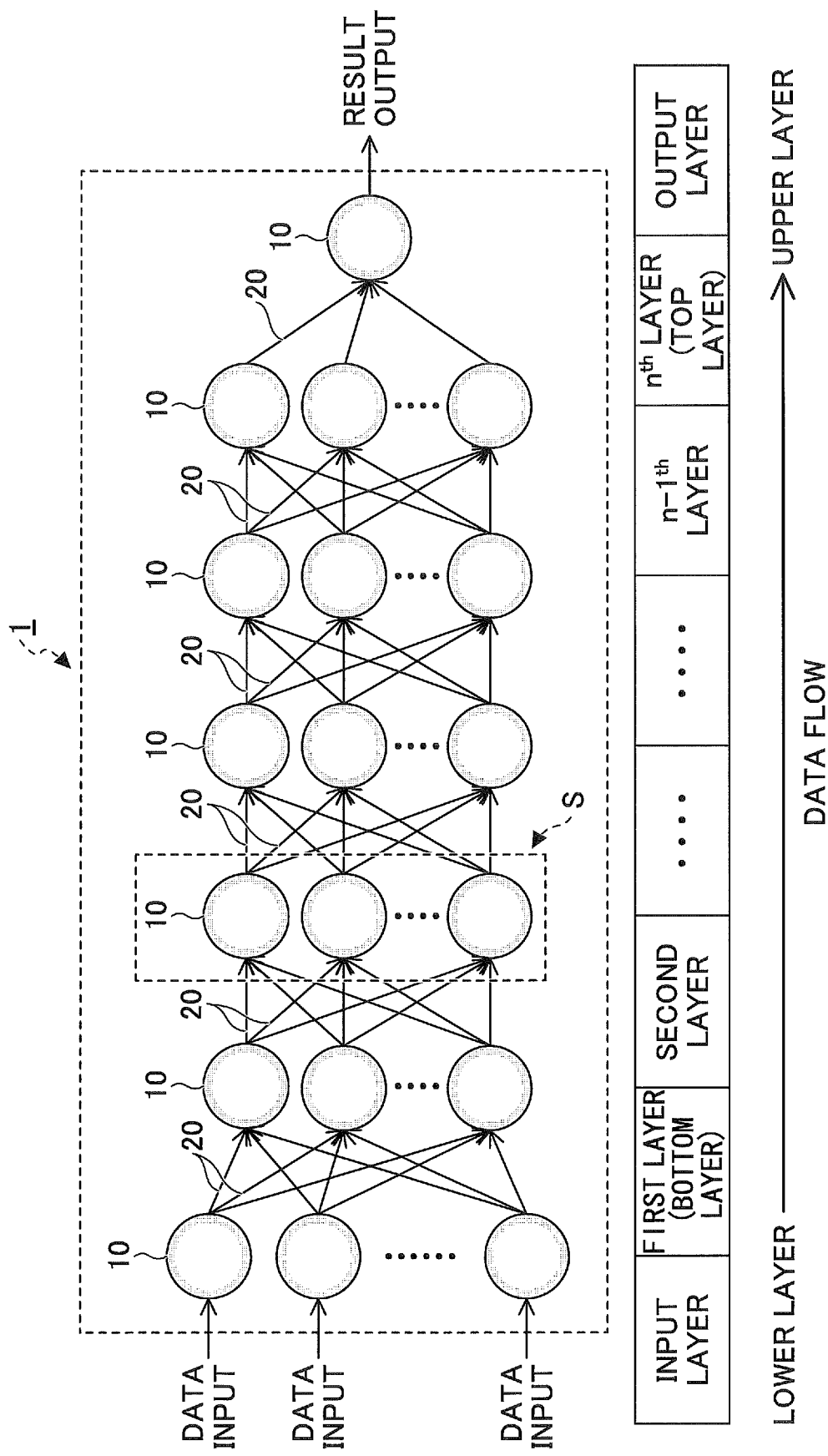
FIG. 1 is a diagram illustrating an example of a neural network according to the first to third embodiments.

In a machine learning having a hierarchical structure and using a neural network, by restricting use of weights of synapses to a specific layer among n layers in the neural network, it is possible to reduce a restoration risk of training data. However, by restricting a layer using the weights of the synapses, an effect of transfer learning capable of quickly reaching a learning result with a lower error is reduced.

It is possible to evaluate by using the training data the extent of the restoration risk of the training data, or whether it is necessary to use the learning result (that is, the weights of the synapses) in a case of the transfer learning. However, because at the time of the transfer learning, the training data are data for which a learning has been already completed, and deleted or the like, it is difficult to refer to the training data. Hence, an accurate evaluation of the restoration risk using the training data is difficult.

In the following, embodiments of the present invention will be described with reference to the accompanying drawings. In the present specification and the drawings, the same reference numerals are given to elements having substantially the same functional configuration, and redundant explanation will be omitted.

(Machine Learning)

As illustrated in FIG. 1, a neural network 1 having a hierarchical structure is formed by multiple neurons 10 and synapses 20 connecting thereto. For instance, the neural network 1 in FIG. 1 includes the hierarchical structure of an input layer, a first layer (a bottom layer), a second layer, . . . , an n−1$^{th}$ layer, an n$^{th}$ layer (a top layer), and an output layer. Synapses are classified to these layers. A side of the first layer indicates a lower layer, and a side of the n$^{th}$ layer is upper layer. A learning using the neural network 1 having such a structure of multiple layers is called a deep learning (DL: Deep Learning).

Data are input from the input layer and propagate through the neurons 10 and the synapses 20 from the lower layer to the upper layer. A learning result is output from the output layer. When inputting certain data, weights of the synapses 20 are learned. That is, the learning result is accumulated as the weights applying to the respective synapses 20. In order to acquire the learning result of high recognition accuracy, multiple pieces of training data being input to the neural network 1 are needed at the learning.

Figure 2:
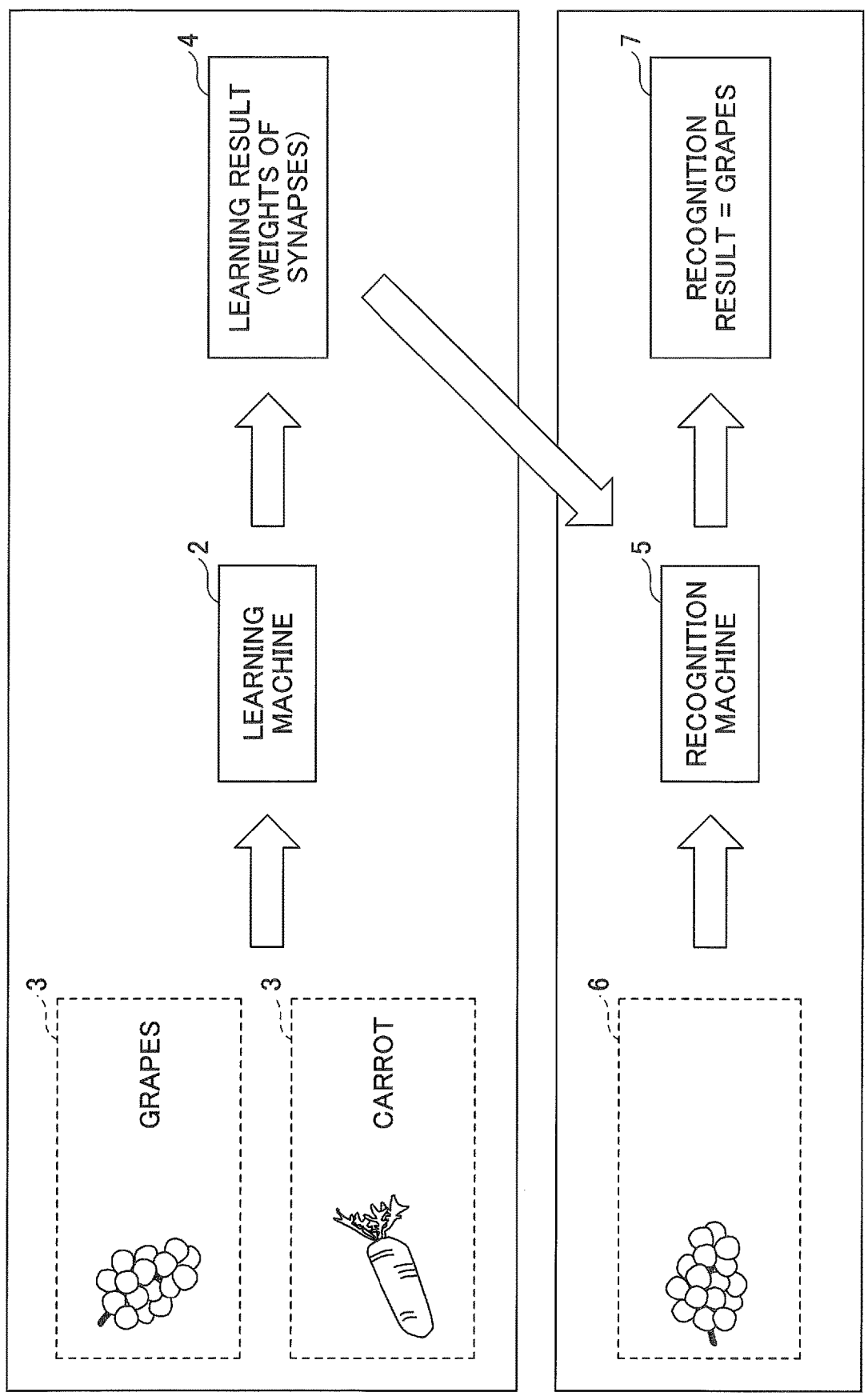
FIG. 2 is a diagram for explaining machine learning.

FIG. 2 illustrates an example of a machine learning by a learning machine 2 forming the neural network 1. The learning machine 2 is an example of an information processing apparatus. The information processing apparatus may be realized by any electronic device including a function of the neurons 10, a function of the synapses 20, and a function for changing the weights of the synapses 20 (bonding strengths of the synapses 20). For example, the information processing apparatus may be realized by a server or the like on a cloud, which connects to a device of a customer through a network.

There are two types of data; the training data, and test data, as data being input. As depicted in an upper part of FIG. 2, as the training data 3 to be input at the learning, a photograph of grapes and a character string "GRAPES" expected from the photograph of the grapes, and a photograph of a carrot and a character string "CARROT" expected from the photograph of the carrot are exemplified. The neural network 1 is formed in which each of the character strings is allocated to the output layer of the neurons 10.

Moreover, the training data 3 are not limited to image data such as a photograph, and may be any type of data such as audio data, character data, numeral data, and the like. The learning machine 2 receives the training data 3 from the customer at the learning, performs the learning, and outputs a learning result 4. The learning result 4 indicates respective weights of the synapses 20.

For instance, at a recognition, test data are provided from a device of the customer. As depicted in a lower part of FIG. 2, for instance, when providing the photograph of the grapes alone as the test data 6, a recognition machine 5 conducts a recognition process (image recognition and the like) depending on the test data 6 of the photograph of the grapes being input, and provides a recognition result 7 to the customer. The recognition machine 5 may be the same machine as the learning machine 2, or may be a different machine. In FIG. 2, a case, in which the recognition machine 5 inputs the photograph of the grapes and outputs the character string "GRAPES", is exemplified. Because an activity level of the neuron 10 of the output layer corresponding to the string "GRAPES" becomes maximum, the character string "GRAPES" is output. Because the weights of the synapses 20 are optimized based on the learning result at the learning, the character string of the grapes is able to be output from the photograph of the grapes being input. The recognition machine 5 is not limited to an image recognition, and is able to perform various recognition processes such as an audio recognition, a character recognition, and the like. According to the learning using the neural network 1, depending on the task, a high recognition accuracy exceeding a human being may be obtained.

Figure 3:
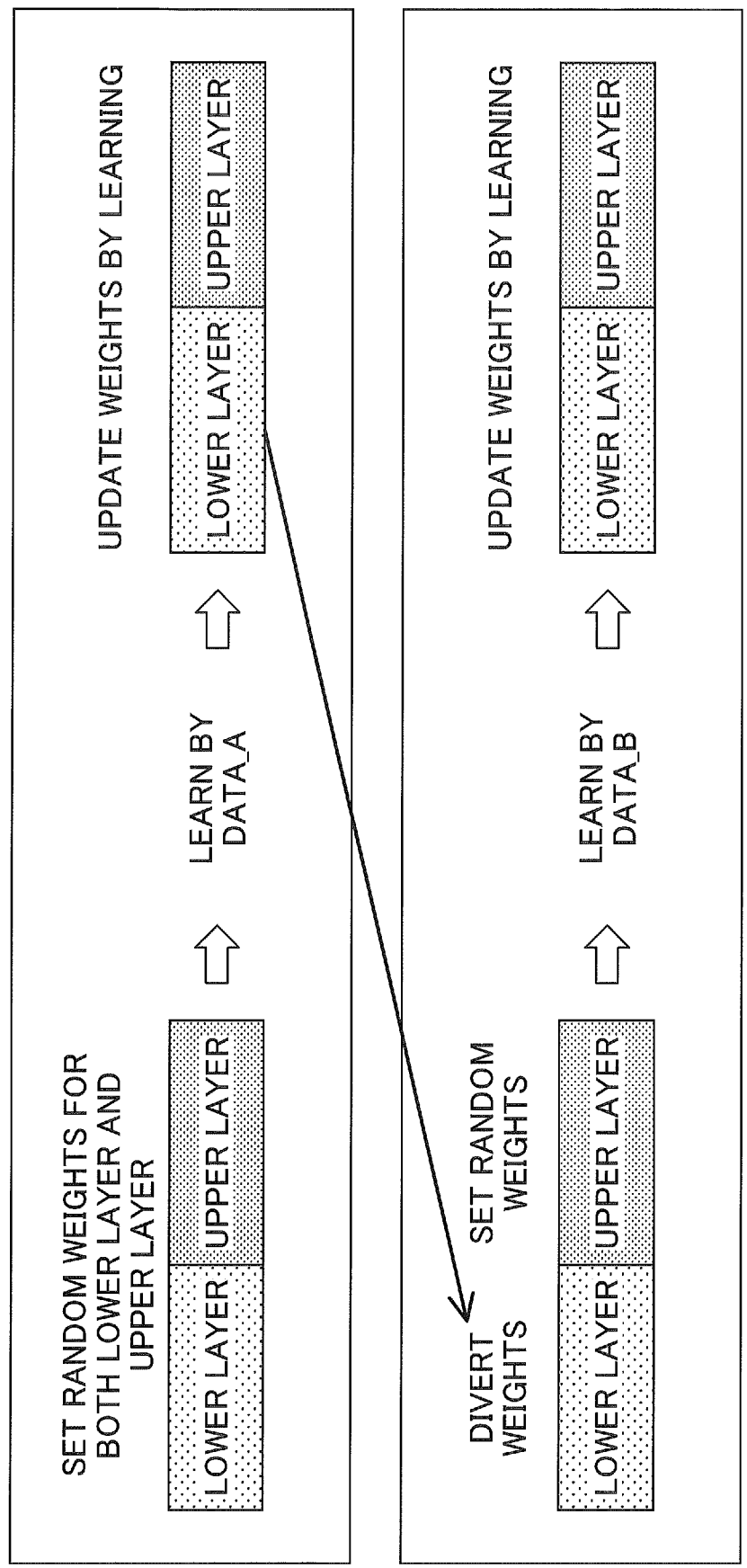
FIG. 3 is a diagram for explaining transfer learning.

As a technology for improving the recognition accuracy of the deep learning, there is a "transfer learning" for diverting the weights at a lower layer from other learning results. The transfer learning will be described with reference to FIG. 3. In FIG. 3, for convenience of an explanation, the neural network 1 forming the multiple layers of FIG. 1 is divided into two layers: a lower layer side and an upper layer side, and is schematically depicted by the lower layer and the upper layer. At the learning depicted in the upper part of FIG. 3, data_A are provided as the training data. In this case, random weights are set to the upper layer and the lower layer, and respective weights of the synapses 20 are updated as a result of the learning by the learning machine 2 based on their weights.

After the learning by the data_A, at the learning depicted in the lower part of FIG. 3, data_B are provided as the training data. In this case, the weights of the synapses, which are updated at the learning by the data_A, are diverted to the weights at the lower layer (the transfer learning). Also, the random weights are set to the weights of the upper layer, and the weights are updated for each of the synapses as a result of the learning by the learning machine 2 based on those weights. As described above, in the transfer learning, the learning machine 2 is able to acquire a high recognition accuracy by diverting the weights of the synapses 20 from other learning result even with less training data.

While there is a diversion effect, transfer learning has a risk of restoration. Specifically, it is possible to restore the training data to some extent from the weights of the synapses by using a method disclosed in Non-Patent Document 2, for instance. For instance, the learning machine 2 generates restoration data, in which a face of a person is projected, from the weights of the synapses based on a face image being input. By this process, it is possible to restore the training data of a face image of the person to some extent. Also, for instance, the learning machine 2 generates restoration data, in which a cat is projected, from the weights of the synapses, when an image of a cat is input. That is, in a case in which the learning machine 2 uses the weights of the synapses acquired by a previous learning by the transfer learning, there is a restoration risk that the training data used in the previous learning may be restored to some extent.

The machine learning includes the following assumptions (1) to (5):

(1) The customer receiving a service of the learning by the learning machine 2 is able to refer to the learning result (the weights of the synapses). The neural network 1 after the learning is operated in a specific environment of the customer (for instance, an automobile, a cellular phone, or the like which the customer manufactures or sells).

(2) The training data 3 exist only at the learning. Because the training data 3 is a property of the customer, a service provider of the learning by the learning machine 2 is not able to use the training data 3 freely. Hence, the service provider needs to delete the training data 3 from a viewpoint of maintaining security, after the learning is completed.

(3) In a case of the transfer learning, diversion of the weights occurs at a timing when another customer conducts the learning, after learning the training data 3.

(4) The diversion effect is not fixed unless there is diversion of weights. The diversion effect depends on similarity between data of a diversion source (for instance, the data_A in FIG. 3, and hereinafter, may be also called "diversion source training data") and data of a diversion destination (for instance, the data_B, and hereinafter, may be also called "diversion destination training data"), and on a diversion allowance range.

(5) Safety of the diversion increases as learning and diversion progress. Because values to be diverted are initial values of the weights of the synapses in a case of conducting the transfer learning, as learning progresses, the weights of the synapses are overwritten. Hence, the restoration risk becomes higher in an initial stage in which the weights of the synapses are diverted.

Under the above described assumptions, it is desired to quantitatively evaluate the diversion effect and the safety of the diversion at a desired time, without actually conducting the learning. As a technology for quantitatively evaluating the diversion effect of the learning result at high speed, instead of actually conducting the learning, there is a method for calculating a distance between the diversion source training data and the diversion destination training data and for evaluating the diversion effect based on the calculated distance. According to this method, the diversion effect is greater in a case of the calculated distance that is shorter than a predetermined reference value, and the diversion effect is less in a case of the calculated distance that is longer than the predetermined reference value. However, in this method, because the diversion source training data are deleted at a time of the diversion as described in the assumption (2), the distance is not calculated. Moreover, in this method, with respect to the weights of the synapses of the multiple layers, it is not considered how much the diversion effect is affected by the extent of diversion of the weights of the synapses. Furthermore, in this method, because there is a comparison criterion of the distance, it is difficult to set a reference value beforehand.

Moreover, as a technology for quantitatively evaluating the safety of the diversion at a given time, there is a method for calculating a distance between the diversion source training data and the restoration data, and for evaluating the safety of the diversion based on the calculated distance. According to this method, it is evaluated that the safety is high for the calculated distance that is longer than a predetermined reference value, and it is evaluated that the safety is low for the calculated distance that is shorter than the predetermined reference value. However, in this method, because the diversion source training data are deleted at the diversion, the distance is not calculated. Also, in this method, there is a comparison criterion of the distance, it is difficult to set the reference value beforehand.

Figure 4:
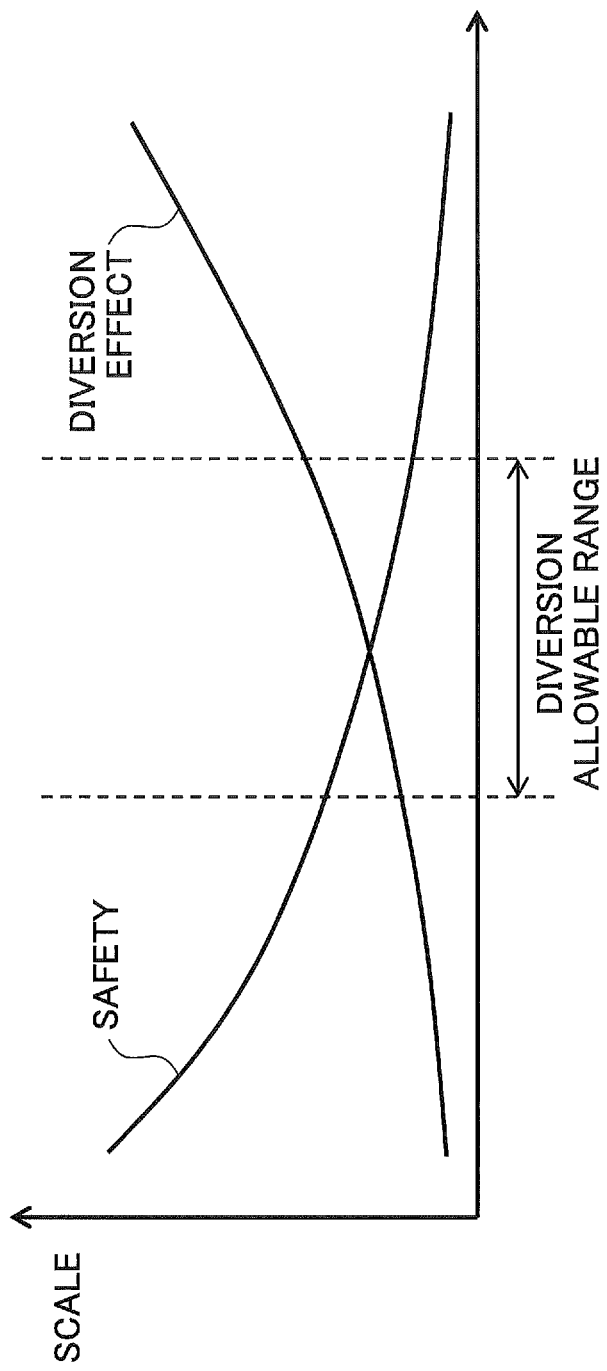
FIG. 4 is a diagram for explaining an outline of a risk evaluation method according to the first to third embodiments.

Therefore, the embodiments provide an information processing apparatus including a function for quantitatively evaluating the safety of the diversion of the weights of the synapses and the diversion effect. By the information processing apparatus according to the embodiments, as depicted in FIG. 4, it is possible to determine the diversion allowable range excluding a range in which the safety is lower than a predetermined level and a range in which the diversion effect is lower than a predetermined effect, based on a quantitative value indicating the safety to divert the weights of the synapses and a quantitative value indicating the diversion effect. Note that the risk evaluation method as performed by the information processing apparatus according to the embodiments is a method which is applicable to the learning machine 2 in FIG. 2 during learning according to deep learning; it is not applicable to conducting a risk evaluation during recognition by the recognition machine 5. Accordingly, regarding the recognition machine 5, it is possible to apply the deep learning as current.

(Risk Evaluation/Safety and Diversion Effect)

In the embodiments, the restoration data are generated at the learning, and a distance between the restoration data and the training data is calculated and stored. For instance, the restoration data may be generated from the weights of the synapses 20 by using a method of Non-Patent Document 2. For instance, input data, which increase the activity level of the neuron 10 of interest, are acquired by the method of Non-Patent Document 2, and the acquired input data are defined as the restoration data. However, a generation method of the restoration data are not limited to the method of Non-Patent Document 2, and any known method may be used.

Figure 5:
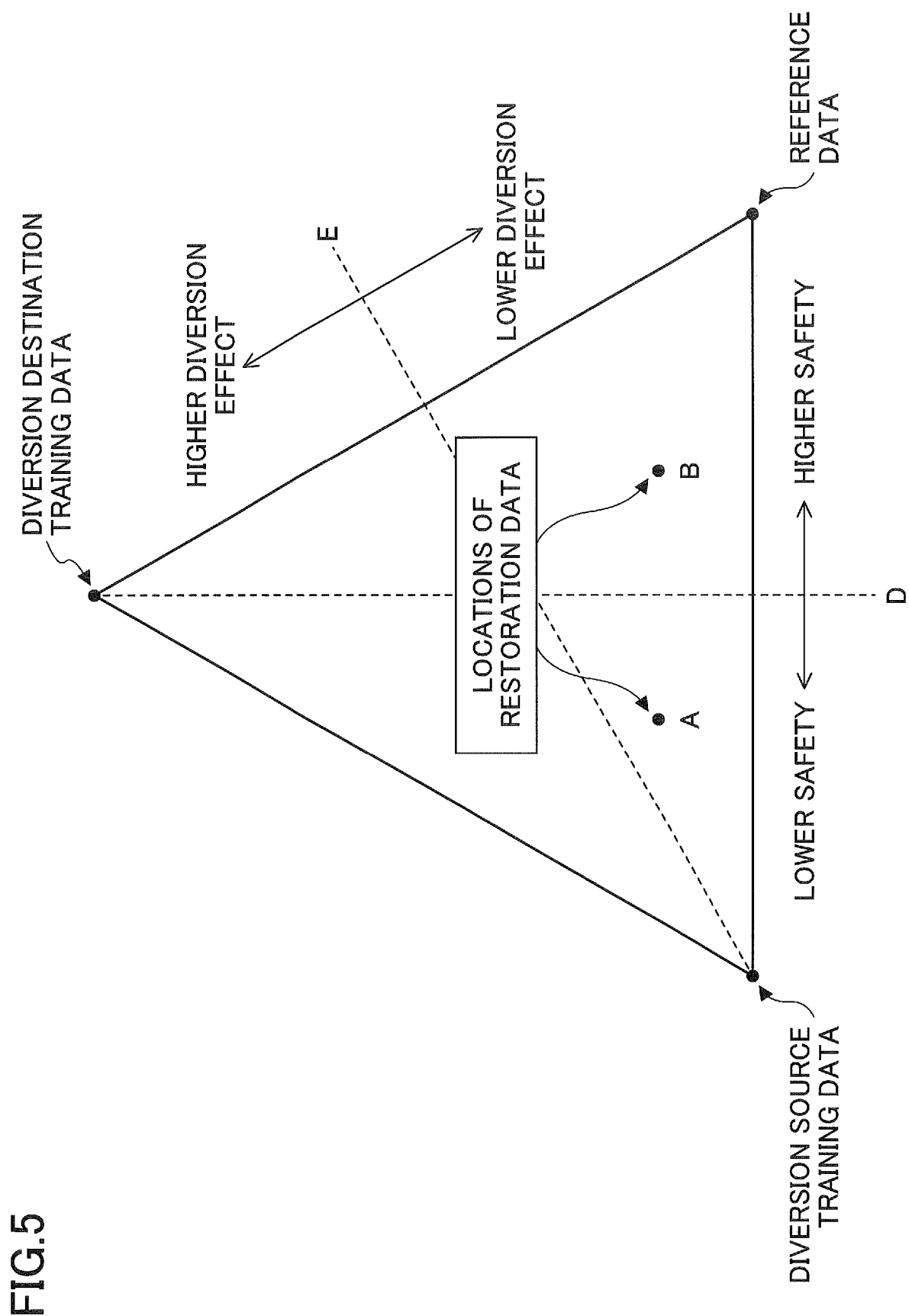
FIG. 5 is a diagram illustrating a relationship among restoration data, safety, and a diversion effect according to the first to third embodiments.

A distance between the restoration data generated at the learning and the diversion source training data is used as an index of the safety of the diversion. Since the restoration data and the training data become less similar as the distance between the restoration data generated at the learning and the diversion source training data become farther, it is determined that an influence is small when the weights of the synapses 20 leak to a third party. Accordingly, when the distance between the restoration data and the diversion source training data is long, it is determined that the safety of the diversion is high. For instance, in FIG. 5 schematically illustrating the distance between pieces of data, a lower left vertex of a triangle is defined as a position of the diversion source training data. In a case in which a position of the restoration data is at a point "A", compared with a case in which the point of the restoration data is at a point "B", the distance between the restoration data and the diversion source training data is shorter. Hence, in a case in which the position of the restoration data is at the point "A", it may be determined that the safety of the diversion is lower than a case in which the position of the restoration data is at the point "B".

It is possible to evaluate the safety of the diversion by the index not only from a viewpoint of the distance between the training data themselves and the restoration data but also from a viewpoint of whether it is easy to identify the training data themselves. For instance, as a comparison criteria of the distance, by retaining reference data other than the diversion source training data being customer data and the diversion destination training data, it is possible to evaluate the safety of the diversion by using the reference data. Moreover, by storing the reference data in a database (hereinafter, may be also called "reference data DB 27a"), it is possible to refer to the reference data at the desired time. Accordingly, it is possible to evaluate the safety of the diversion by using the reference data at the desired time. For instance, the reference data may be any one of various types of data such as an encyclopedia or the like, and may be acquired by collecting data available through the internet or the like. The learning machine 2 may conduct the learning by the deep learning based on the collected reference data, generate the restoration data, and include the generated restoration data in a part of the reference data. Next, the learning machine 2 compares the distance from the restoration data to the reference data and the distance from the restoration data to the diversion source training data.

As illustrated in FIG. 5, it is possible to evaluate the safety of the diversion based on a magnitude between the distance from the restoration data to the reference data and the distance from the restoration data to the diversion source training data. For instance, in a case in which the restoration data are closer to the reference data than the diversion source training data, that is, in a case in which the position of the restoration data places closer to the reference data than a dashed line D with respect to a triangle in FIG. 5, it may be determined that the restoration data are common data. That is, in this case, because the restoration data are more similar to the reference data than to the diversion source training data, that is, the restoration data are common data, it is determined that an effect with respect to leakage of the weights is lower and that the safety of diversion is high.

The distance between the restoration data generated at the learning and the diversion destination training data is set as the index of the diversion effect. The closer the distance between the restoration data generated at the learning and the diversion destination training data, it is determined that the diversion effect is higher. Moreover, it is possible to evaluate the diversion effect based on the distance from the restoration data to the diversion destination training data and the distance from the restoration data to the reference data. For instance, in a case in which the restoration data are closer to the diversion destination training data than the reference data, that is, in a case in which the position of the restoration data places closer to the diversion destination training data than a dashed line E with respect to the triangle in FIG. 5, it means that the restoration data are more similar to the diversion destination training data than the reference data, and therefore, it is determined that the diversion effect is high.

Also, as another comparison criteria of the distance, it is possible to use other training data existing at the risk evaluation. However, because safety is concerned in a case of leaking the weights of the synapses as the learning result, for use of other training data, restrictions or conditions may be set beforehand.

Figure 6:
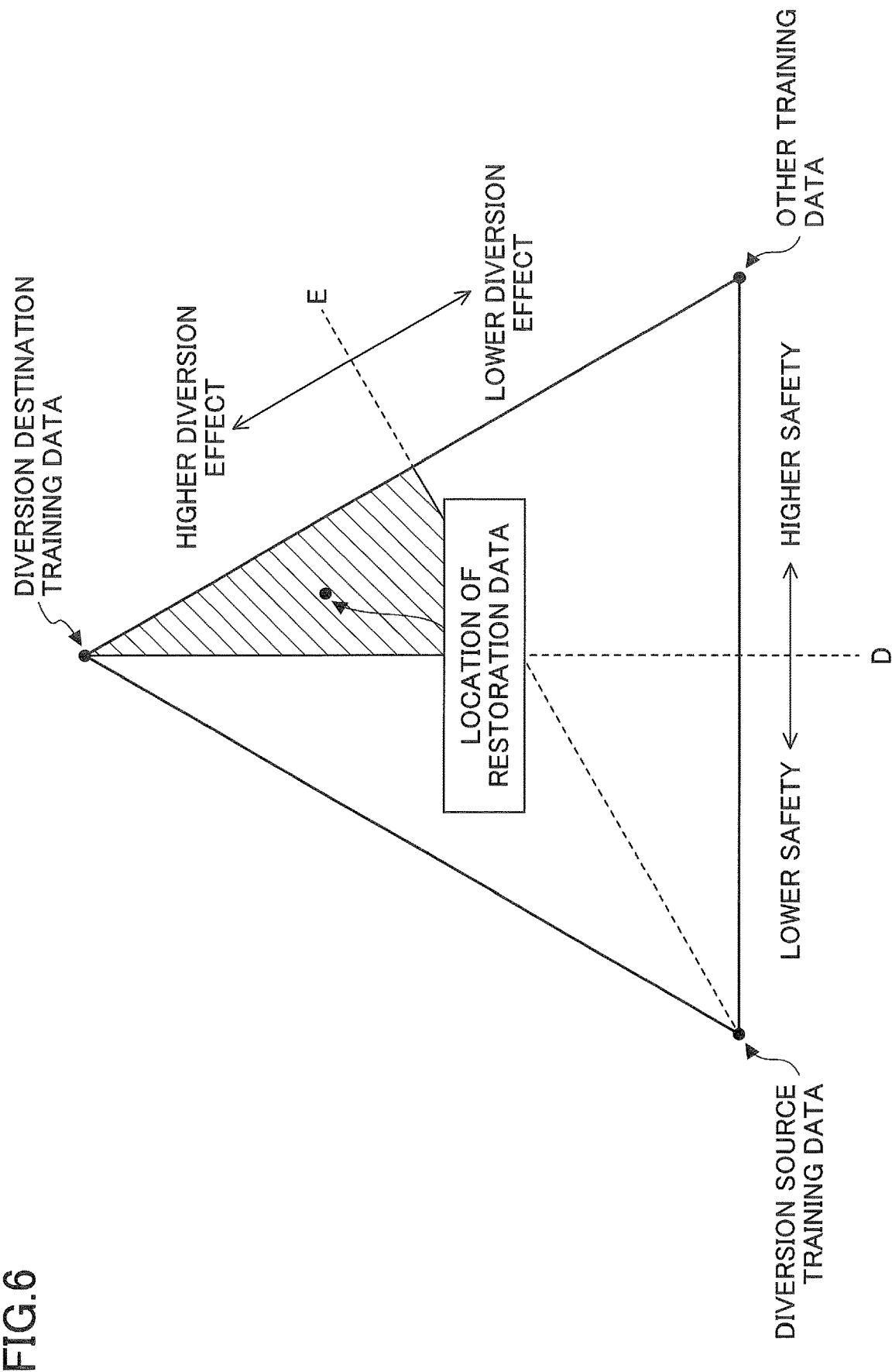
FIG. 6 is a diagram illustrating the relationship among the restoration data, the safety, and the diversion effect according to the first to third embodiments.

The learning machine 2 may conduct the learning by the deep learning based on the other training data, generate the restoration data, and include the restoration data in a part of other training data. In this case, the learning machine 2 compares the distance between the restoration data and the other training data with the distance between the restoration data and the diversion source training data. In a case in which the restoration data are closer to the other training data than the diversion source training data, that is, in a case in which the position of the restoration data places closer to the other training data than a dashed line D with respect to a triangle in FIG. 6, it means that the restoration data are common data. Accordingly, in this case, it is determined that the effect with respect to the weight leakage is lower and that the safety of the diversion is high. Moreover, in a case in which the restoration data are closer to the diversion destination training data than the other training data, that is, in a case in which the position of the restoration data places closer to the diversion destination training data than a dashed line E in the triangle in FIG. 6, it means that the restoration data are more similar to the diversion destination training data than the other training data. In this case, it is determined that the diversion effect is high. For instance, in a case in which the restoration data are within a hatched region, it is determined that the safety of the diversion is high and the diversion effect is high. In the following, as an example of the information processing apparatus capable of quantitatively conducting the risk evaluation from a viewpoint of the safety of the diversion of the learning effect and the diversion effect, the learning machine 2 according to the first through third embodiments will be described in order.

First Embodiment

[Functional Configuration]

Figure 7:
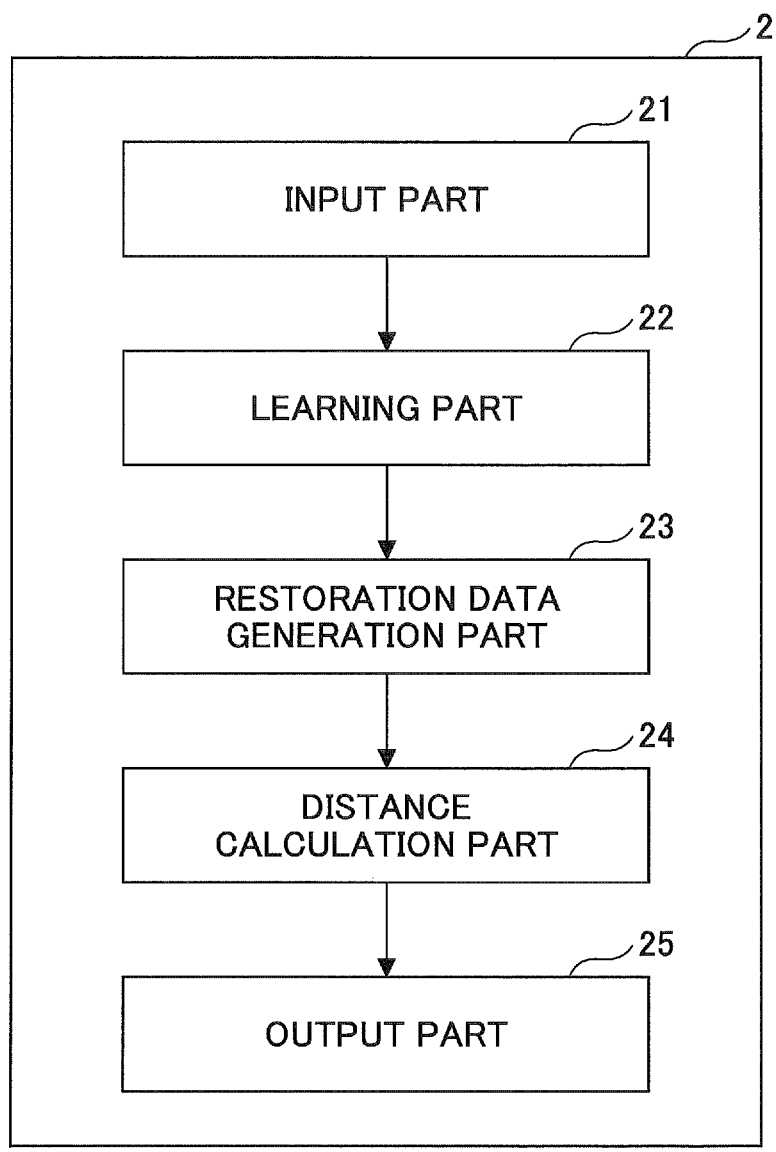
FIG. 7 is a diagram illustrating an example of a functional configuration of a learning machine according to the first embodiment.

An example of a functional configuration of the learning machine 2 will be described with reference to FIG. 7 according to the first embodiment. The learning machine 2 according to the first embodiment includes an input part 21, a learning part 22, a restoration data generation part 23, a distance calculation part 24, and an output part 25. The input part 21 inputs the training data. The learning part 22 randomly sets the weights of the synapses 20 connecting among the neurons 10 of the neural network 1, and conducts the learning by the training data being input. The learning part 22 updates the weights of the synapse 20 as a result of the learning. The learning part 22 conducts the learning with a next training data based on the weights of the synapses 20 acquired by a previous learning.

The restoration data generation part 23 generates the restoration data from the weights acquired as the result of the learning. As the generation method of the restoration data, the method disclosed in Non-Patent Document 2 may be used; however, the generation method is not limited to this method, and any other known method may be used.

The distance calculation part 24 calculates the distance between the restoration data being generated and the training data. A calculation method of the distance is not limited, and any other method may be used. In a case in which multiple pieces of the training data exist, the distance calculation part 24 calculates a plurality of data distances (hereinafter, may be also simply called "distance") between the restoration data and each of the multiple pieces of training data. The output part 25 outputs the weights acquired as the result of the learning and the calculated distance.

[Learning and Risk Evaluation Process]

Figure 8:
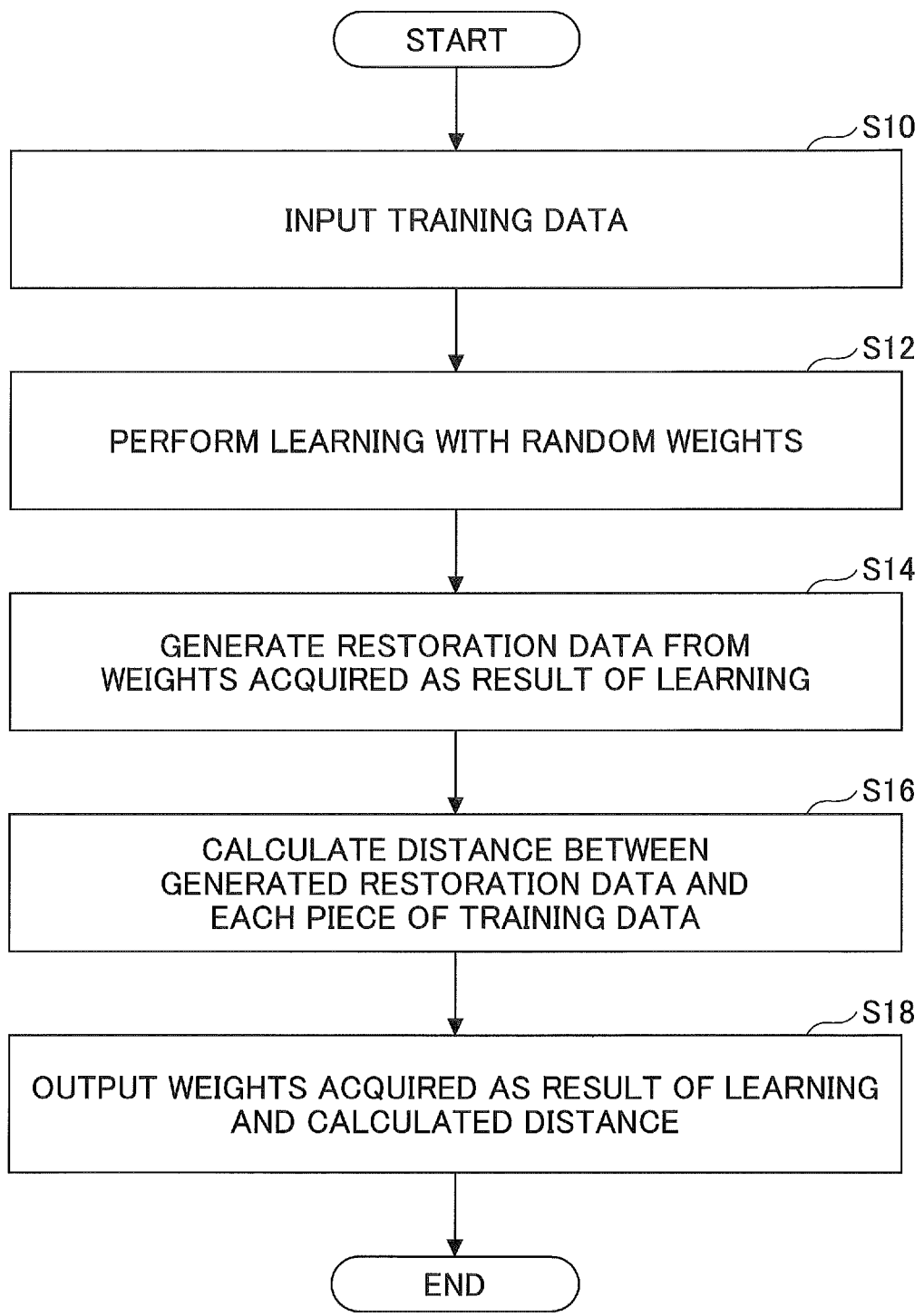
FIG. 8 is a flowchart illustrating an example of a learning and a risk evaluation process according to the first embodiment.

Next, the learning and a risk evaluation process will be described with reference to FIG. 8 according to the first embodiment. When initiating the learning and the risk evaluation process according to this embodiment, the learning part 22 inputs the training data (step S10). The learning part 22 randomly sets the weights of the synapses 20 and conducts the learning by the training data being input (step S12). The restoration data generation part 23 generates the restoration data based on the weights acquired as the result of the learning (step S14). The distance calculation part 24 calculates the distance between the generated restoration data and each piece of the training data (step S16). The output part 25 outputs the weights acquired as the result of the learning and the calculated distances step S18), and terminates this process.

As described above, by the learning machine 2 according to the first embodiment, the distance between the calculated restoration data and the training data is output. By this output, it is possible to quantitatively evaluate the safety of the diversion of the weights of the synapses 20 indicating the result of the learning and the diversion effect based on the distance. Moreover, based on the distance between the calculated restoration data and the training data, it is possible to define the diversion allowable range of the weights of the synapses 20 indicating the result of the learning in consideration of both the safety of the diversion and the diversion effect.

Second Embodiment

Next, a functional configuration of the learning machine 2 according to a second embodiment including a process for determining the diversion allowance range of the weights of the synapses 20 and the risk evaluation process conducted by the learning machine 2 will be described.

[Functional Configuration]

Figure 9:
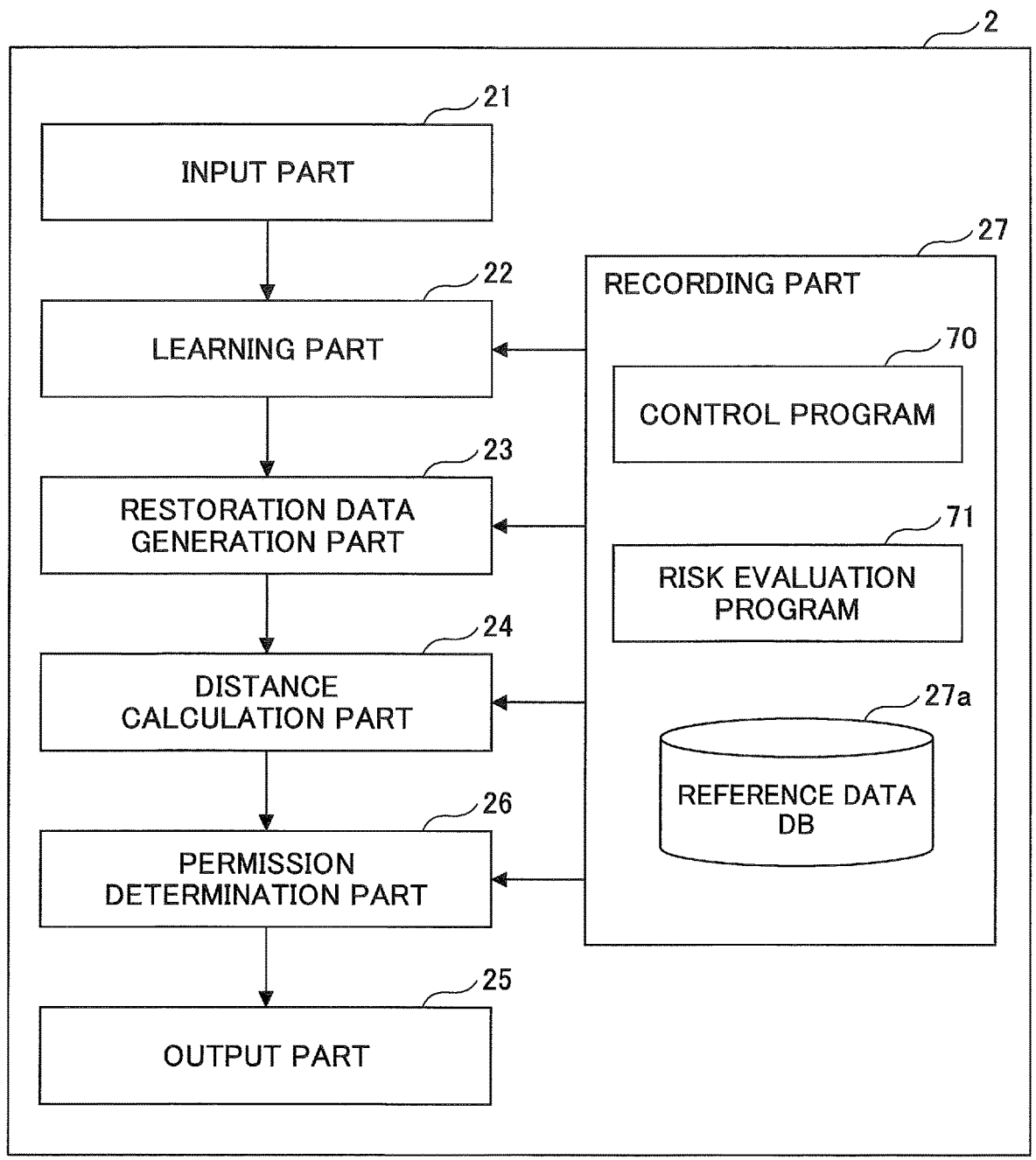
FIG. 9 is a diagram illustrating an example of a functional configuration of the learning machine according to the second embodiment.

An example of the functional configuration of the learning machine 2 will be described with reference to FIG. 9, according to the second embodiment. The learning machine 2 according to the second embodiment includes the input part 21, the learning part 22, the restoration data generation part 23, the distance calculation part 24, a permission determination part 26, the output part 25, and a recording part 27. The input part 21 inputs the diversion source training data or the diversion destination training data. The learning part 22 randomly sets the weights of the synapses 20 of the neural network 1, conducts the learning by the input training data, and updates the weights of the synapses 20 as the result of the learning.

The restoration data generation part 23 generates the restoration data based on the weights acquired as the result of the learning. The generation method of the restoration data is not limited, and any other method may be used.

The distance calculation part 24 calculates the distance between the generated restoration data and the diversion source training data. The distance calculation part 24 calculates the distance between the generated restoration data and the diversion destination training data. The distance calculation part 24 calculates the distance between the generated restoration data and the reference data. In a case in which there are multiple pieces of data for each of the diversion source training data, the diversion destination training data, and the reference data, the distance calculation part 24 calculates each of the distance between the restoration data and each piece of the diversion source training data, the distance between the restoration data and each piece of the diversion destination training data, and the distance between the restoration data and the reference data. The calculation method of the distances among various types of data is not limited, and any other method may be used.

The permission determination part 26 determines the diversion allowance range of the weights based on the distance between the restoration data and each piece of the diversion source training data, the distance between the restoration data and each piece of the diversion destination training data, and the distance between the restoration data and the reference data. The output part 25 outputs the weights acquired as the result of the learning and the diversion allowance range. The recording part 27 stores the reference data in the reference DB 27a (DataBase). The recording part 27 may record a program (a control program 70) for the entire control conducted by the learning machine 2 such as the learning process and the like, and a program (a risk evaluation program 71) for the learning machine 2 to conduct the risk evaluation.

[Learning and Risk Evaluation Process]

Figure 10:
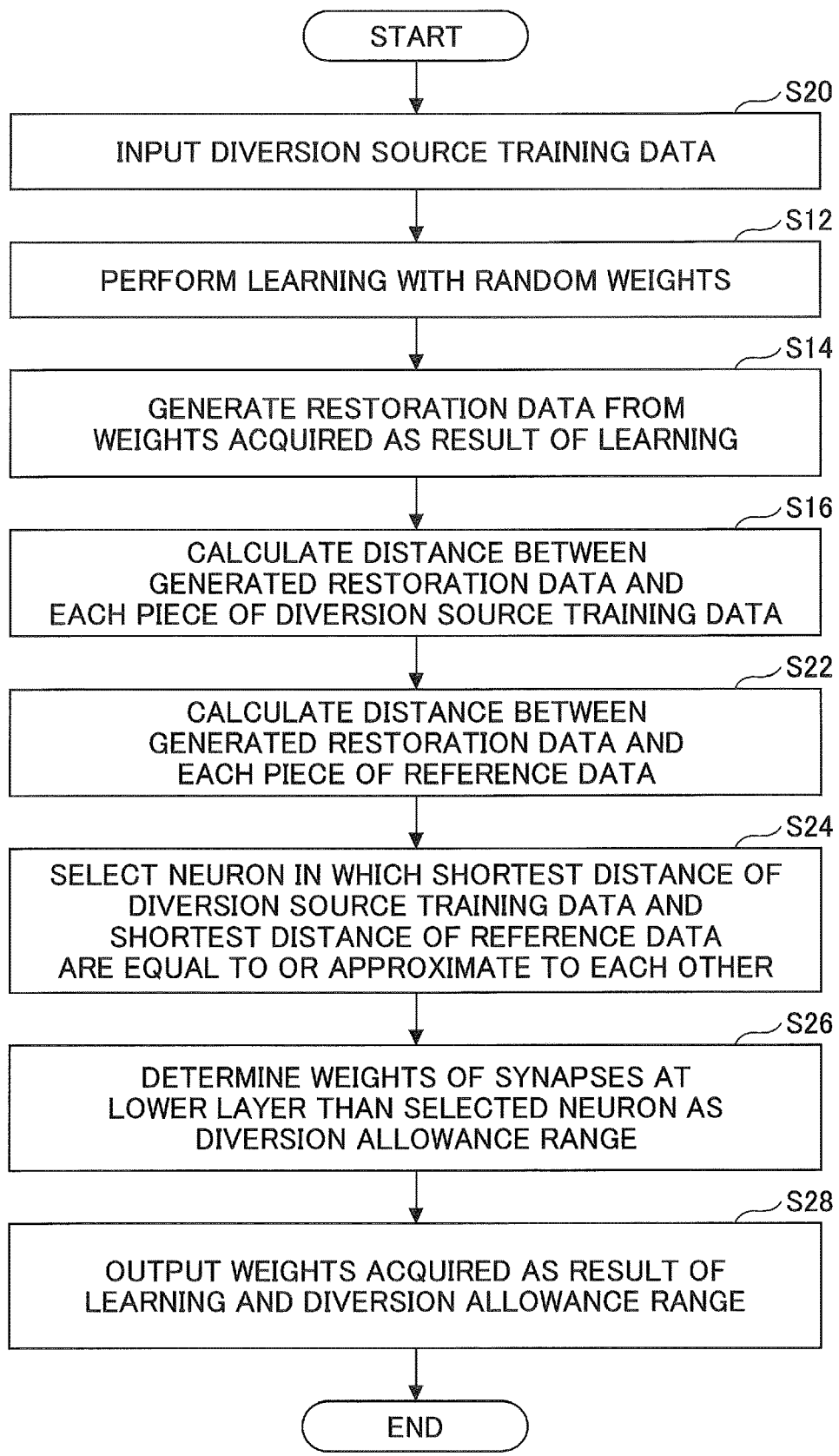
FIG. 10 is a flowchart illustrating an example of the risk evaluation process at the learning of a diversion source according to the second embodiment.
Figure 11:
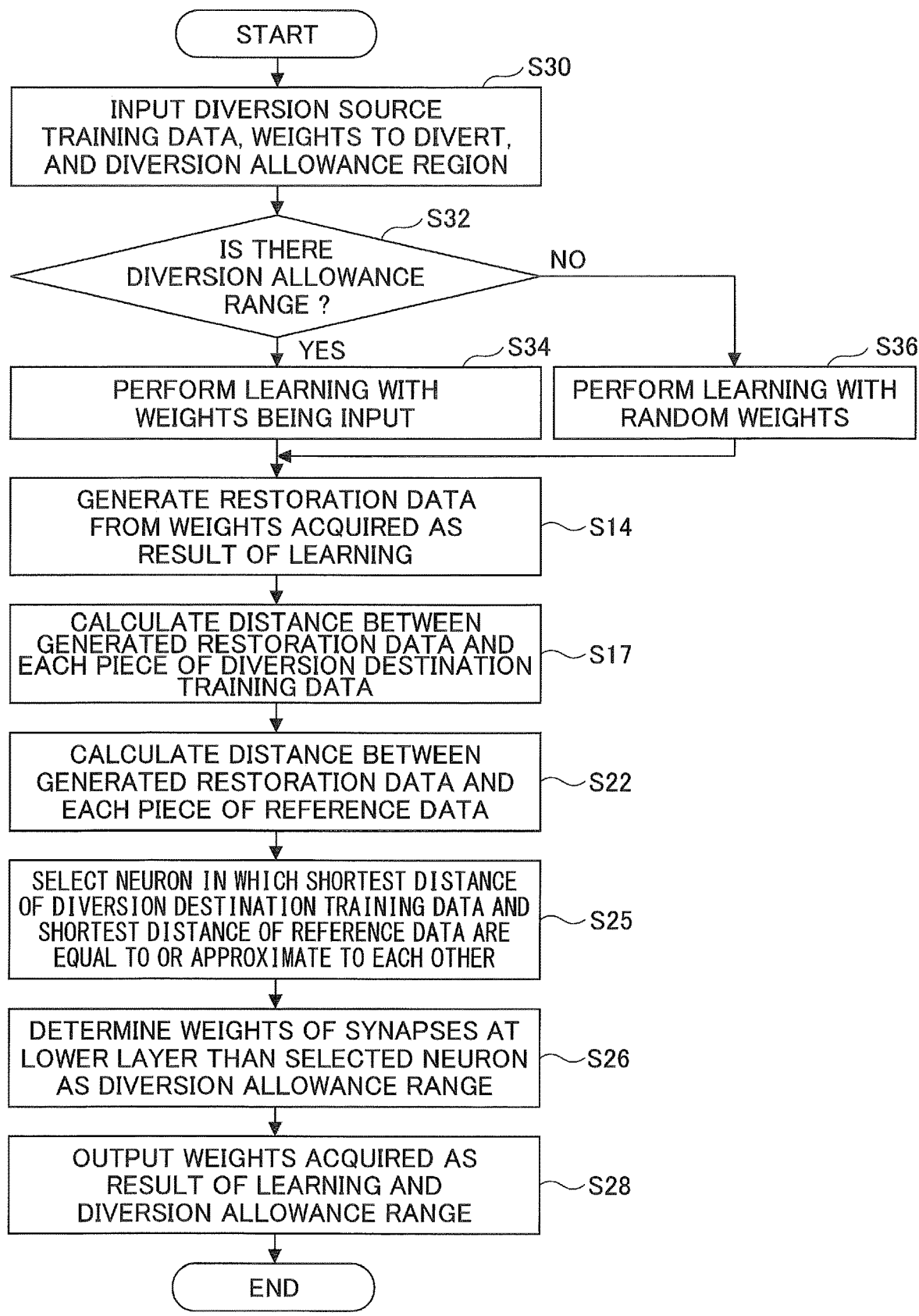
FIG. 11 is a flowchart illustrating the example of the risk evaluation process at the learning of the diversion source according to the second embodiment.

Next, the learning and the risk evaluation process will be described with reference to FIG. 10 and FIG. 11, according to the second embodiment. FIG. 10 is a flowchart illustrating an example of the risk evaluation process at an execution of the machine learning (at the learning) with the diversion source training data according to the second embodiment. FIG. 11 is a flowchart illustrating an example of the risk evaluation process at the learning with the diversion destination training data according to the second embodiment.

When initiating the risk evaluation process at the learning with the diversion source training data depicted in FIG. 10, the input part 21 inputs the diversion source training data (step S20). The learning part 22 conducts the learning with random weights based on the diversion source training data being input (step S12). The restoration data generation part 23 generates the restoration data based on the weights as the result of the learning (step S14), and the distance calculation part 24 calculates the distance between the generated restoration data and each piece of the diversion source training data (step S16).

Next, the distance calculation part 24 calculates the distance between the generated restoration data and each piece of the reference data based on the reference data DB 27a (step S22). Subsequently, the permission determination part 26 selects the neuron 10, in which a shortest distance among one or more pieces of the diversion source training data is equal to or approximate to a shortest distance among one or more pieces of the reference data (step S24). Next, the permission determination part 26 determines, as the diversion allowance range, the weights of the synapses at layers lower than the selected neuron 10 (step S26). The output part 25 outputs the weights acquired as the result of the learning and the diversion allowance range (step S28), and terminates this process.

As described above, by the learning machine 2 according to the second embodiment, a neuron is selected, in which the shortest distance between the restoration data and the training is equal to or nearly equal to the shortest distance between the restoration data and the reference data, and weights of the synapses at layers lower than the selected neuron are determined as the diversion allowable range. The weights at the layers lower than the selected neuron exemplify weights up to a specified layer.

In the deep learning, at the lower layer the neurons 10 are more general, at the upper layer the neurons 10 become higher task-specialized factors. Accordingly, at the lower layer the neurons 10 are closer to the reference data, the more the safety of the diversion is improved. For instance, in step S24, in a case in which one of the neurons 10 surrounded by a frame S is selected, in the present embodiment, the weights of the synapses 20 at the first layer and the second layer may be determined as the diversion allowable range. In this case, the weights of the synapses 20 at the third layer through the $n^{th}$ layer are in a range of not allowing the diversion (the diversion not-allowed range). Therefore, it is possible to quantitatively evaluate the safety of the diversion of the learning result and the diversion effect. However, if one of the neurons 10 surrounded by the frame S is selected in FIG. 1, only the weights of the synapses 20 at the second layer may be determined as the diversion allowance range. Moreover, in a case in which two or more neurons 10 surrounded in the frame S are selected in FIG. 1, among the weights of the synapses 20 at the second layer, only the weights connected to the selected neurons 10 may be determined as the diversion allowance range.

Next, the risk evaluation process performed at the learning with the diversion source training data will be described with reference to FIG. 11. When initiating the risk evaluation process at the learning with the diversion destination training data in this embodiment, the input part 21 inputs the diversion destination training data, the weights to be diverted, and the diversion allowance range (step S30). Next, the learning part 22 determines whether the diversion allowance range is set (step S32). When the diversion allowance range is set (when the diversion allowance range is not empty), the learning part 22 conducts the learning by using the input weights (step S34). When the diversion allowance range is not set (when the diversion allowance range is empty), the learning part 22 conducts the learning by using random weights (step S36).

In processes following step S14, in a view in which target data are the diversion destination training data in processes of steps S17 and S25 in FIG. 11, the target data in processes of steps S16 and S24 in FIG. 10 are different from the diversion source training data: however, the processes themselves are the same and explanations of the processes following step S14 will be omitted.

As described above, by the learning machine 2 according to the second embodiment, at the learning with the diversion destination training data, it is possible to realize the learning at high speed and with high accuracy by using a result of the learning with the diversion source training data. In addition, in this embodiment, it is possible to conduct the learning of the diversion destination by using the weights in the diversion allowance range, which are acquired at a result from quantitatively evaluating the safety of the diversion of the learning result and the diversion effect. Therefore, it is possible to obtain an appropriate diversion effect in a range ensuring the safe of the training data.

In steps S24, S25, and S26 in FIG. 10 and FIG. 11, the diversion allowance range is determined based on the shortest distance among distances among each of multiple pieces of the training data (multiple pieces of the diversion source training data or the diversion destination training data) and the restoration data. However, a determination method of the diversion allowance range is not limited to this method; for instance, the diversion allowance range may be determined based on any of an average value, a median, and a minimum value and a maximum value.

(First Variation)

In this embodiment and other embodiments, a first variation concerning the diversion method of the weights will be described with reference to FIG. 12. For instance, the learning is conducted multiple times by changing layers to divert among weights, which are input for diversion and being learned, so that the diversion is optimized with respect to given weights.

Figure 12:
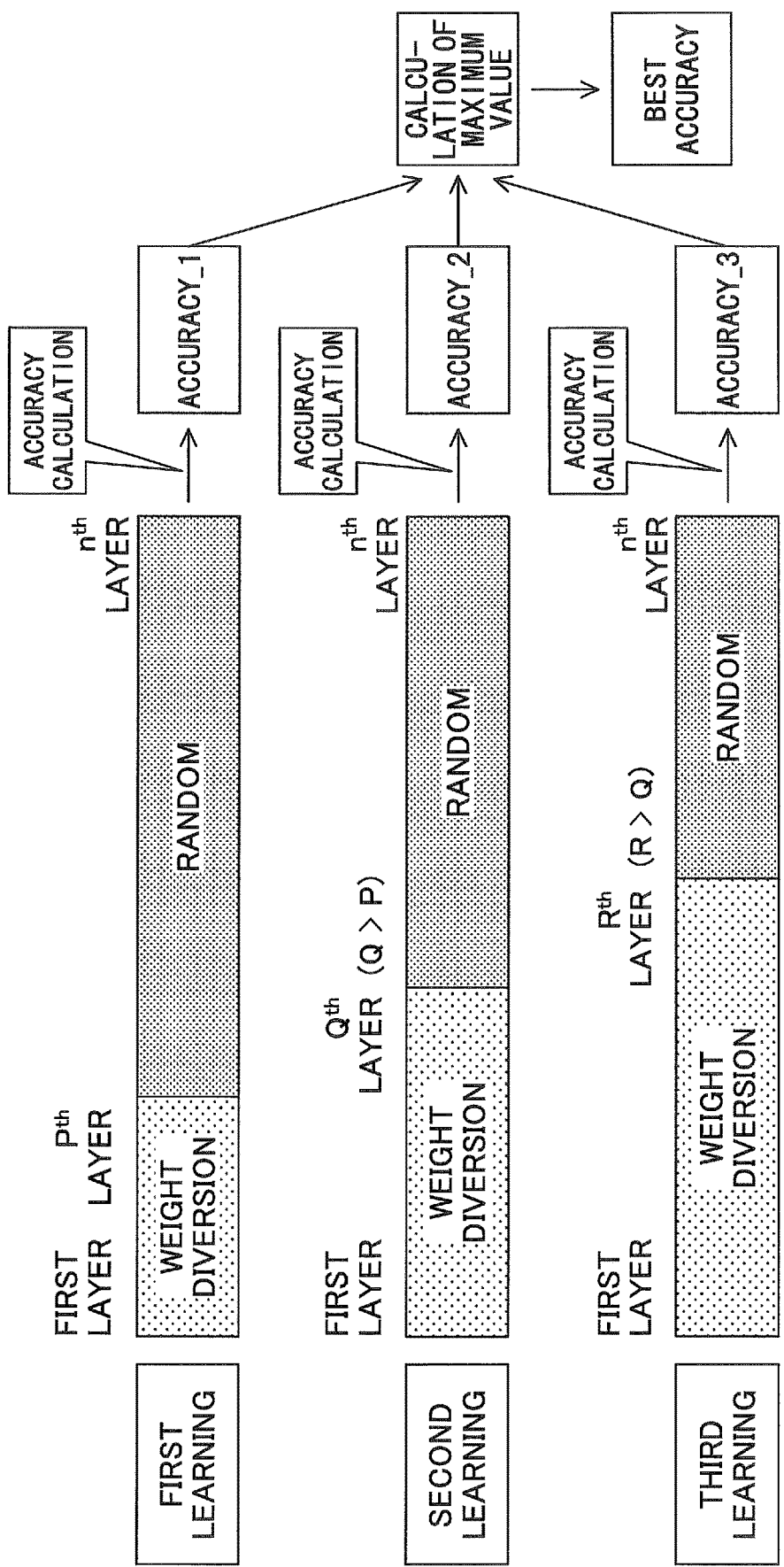
FIG. 12 is a diagram for explaining an example of a risk evaluation according to the first to third embodiments.

At a first learning, as depicted at an uppermost part in FIG. 12, the learning is conducted by diverting weights at a $P^{th}$ layer and layers lower than the $P^{th}$ layer, that is, weights at the first layer through the $P^{th}$ layer. The $P^{th}$ layer is an example of a specific layer.

At a second learning, as depicted at middle in FIG. 12, the learning is conducted by diverting weights at a $Q^{th}$ layer and layers lower than the $Q^{th}$ layer, that is, weights at the first layer through the $Q^{th}$ layer (Q>P). The $Q^{th}$ layer is an example of a specific layer.

At a third learning, as depicted at lowermost part in FIG. 12, the learning is conducted by diverting weights at an $R^{th}$ layer and layers lower than the $R^{th}$ layer, that is, weights at the first layer through the $R^{th}$ layer (R>Q>P). The $R^{th}$ layer is an example of an specific layer. Random weights are set for layers higher than the specific layer.

Accuracies calculated at the first through third learnings are indicated as "ACCURACY_1" through "ACCURACY_3". For instance, the learning machine 2 may conduct the learning with the training data, and the recognition machine 5 may conduct the recognition with the test data, and thus, a ratio at which a recognition result matches a correct answer established beforehand may be determined as a calculated accuracy. A count of the learning is not limited to three.

The maximum value in calculated ACCURACY_1 through ACCURACY_3 is an optimal accuracy. Weights at the specific layer corresponding to the accuracy of the maximum value may be selected, and the learning may be conducted by diverting the weights. Weights may not be diverted in the diversion not-allowed range and random weights may be applied in the diversion not-allowed range. The allowance range is an example of an allowable level, which is set by permitting to use weights of the synapses up to the specific layer among weights of the synapses at the multiple layers.

The calculation method of the accuracy is not limited to the above, and any known method may be used. In order to accelerate a calculation of the accuracy, the restoration data may be generated prior to the learning, the distance between the diversion destination training data and the restoration data may be calculated, the weights may be limited to a predetermined number of weight in which distances are shorter, the diversion of the weights may be permitted, and then, the learning may be performed by using a restricted number of the weights permitted to divert.

In a case in which an explanation of the neural network 1 is disclosed, for restriction to a neural network determined as conforming to the learning as defined or as close to the learning as defined, selection of the weights diverting the learning result may be conducted.

(Second Variation)

In this embodiment and other embodiments, a second variation concerning the calculation of the distance to the restoration data will be described with reference to FIG. 13 and FIG. 14. For instance, when the distance between the generated restoration data and the training data is calculated, as illustrated in FIG. 13, for instance, the training data "A" themselves may be compared with the restoration data generated by using all weights at the upper layers and the lower layers, and the distance between the restoration data and the training data may be calculated.

Figure 13:
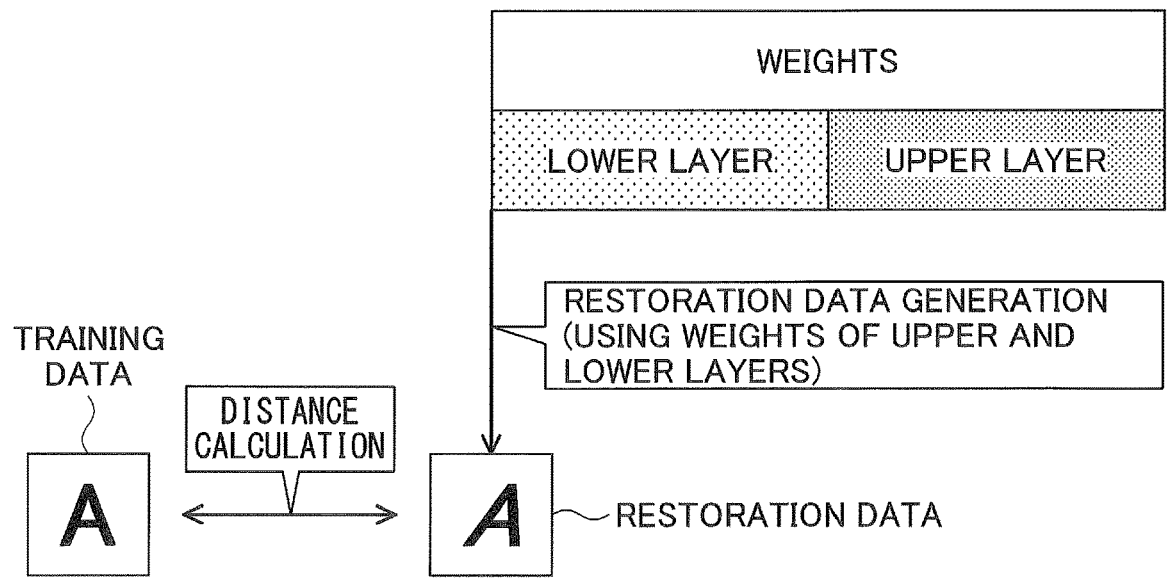
FIG. 13 is a diagram for explaining the example of the risk evaluation according to the first to third embodiments.
Figure 14:
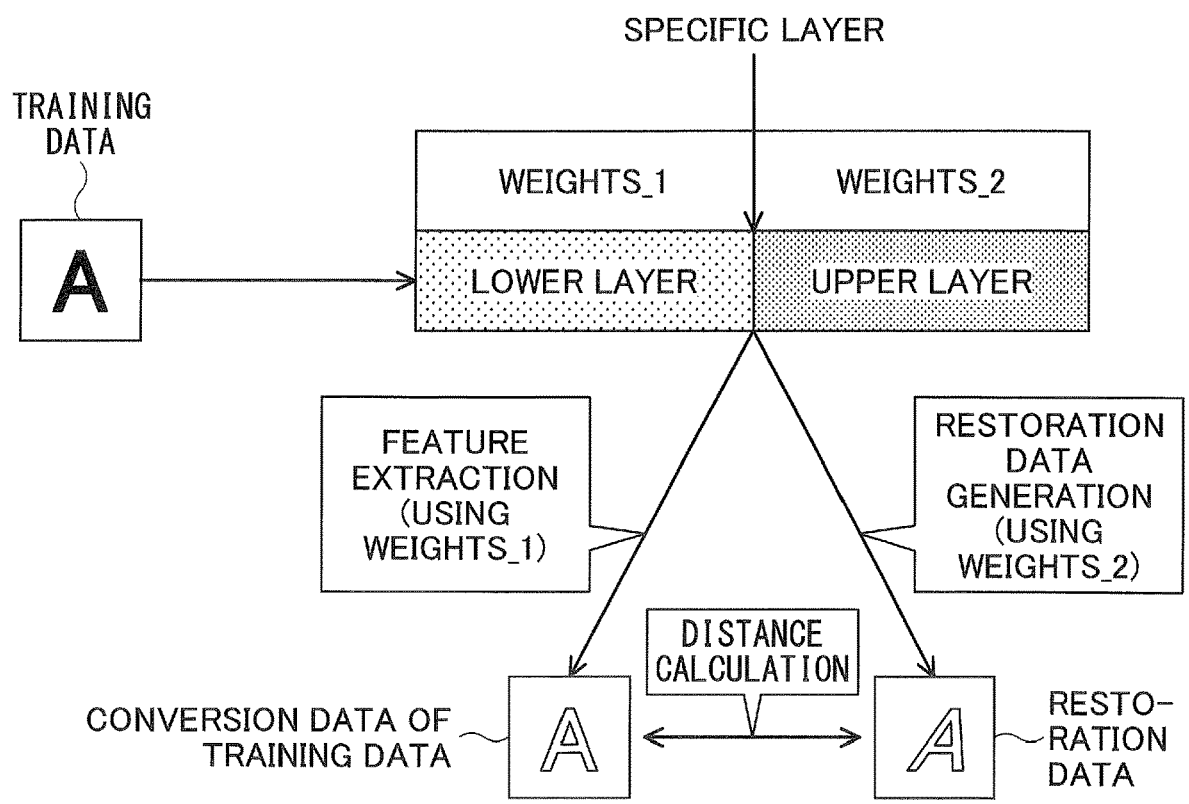
FIG. 14 is a diagram for explaining the example of the risk evaluation according to the first to third embodiments.

However, the calculation is not limited to the one in FIG. 13, and as illustrated in FIG. 14, instead of the training data themselves, conversion data, in which the training data "A" are inputted, and features of the training data "A" are extracted by using weights_1 at the lower layer, may be compared with the restoration data generated by using weights_2 at the upper layer. In this case, a distance resulted from a comparison is the distance between the restoration data and the training data. Instead of using the training data themselves, by using the conversion data of the training data, it is possible to reduce calculations for calculating the distances.

Moreover, the restoration data may be generated based on the weights of the synapses at a part of the layers (for instance, the weights_2 in FIG. 14). The distance between the restoration data and the training data may be acquired by calculating the distance between the training data themselves and the restoration data, or by calculating the distance between the conversion data of the training data and the restoration data.

Third Embodiment

Next, the learning machine 2 according to a third embodiment including a process for evaluating the calculated distance and the risk evaluation process performed by the learning machine 2 will be described.

[Functional Configuration]

Figure 15:
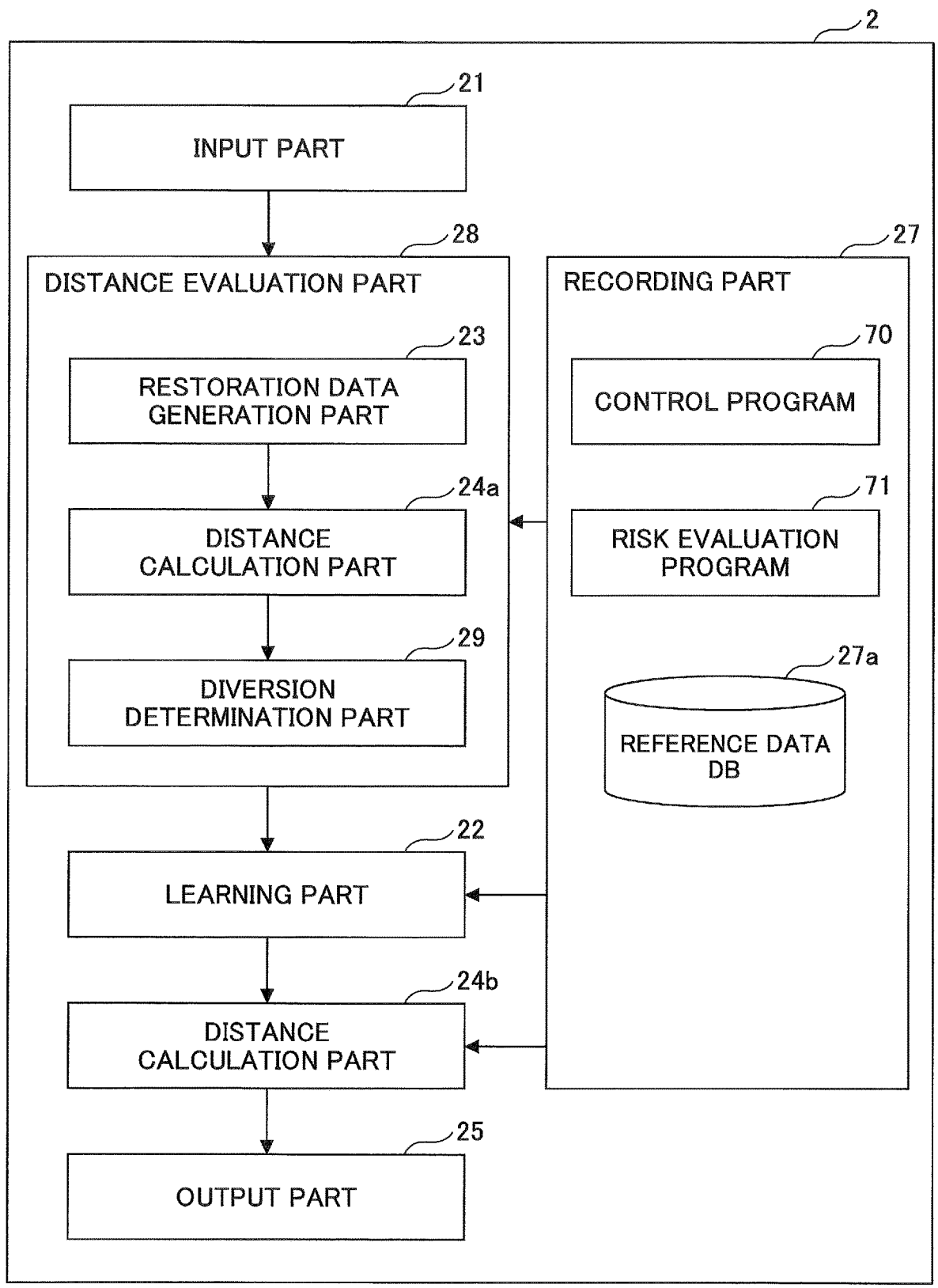
FIG. 15 is a diagram illustrating an example of a functional configuration of a learning machine according to the third embodiment.

An example of a functional configuration of the learning machine 2 will be described with reference to FIG. 15, according to the third embodiment. The learning machine 2 according to the third embodiment includes the input part 21, a distance evaluation part 28, the learning part 22, a distance calculation part 24b, the output part 25, and the recording part 27. Different from the second embodiment, the learning machine 2 according to the third embodiment includes the distance evaluation part 28, and does not include the permission determination part 26 included in the learning machine 2 according to the second embodiment. Accordingly, among functions illustrated in FIG. 15, the distance evaluation part 28, which is different from the second embodiment, will be described, and explanations of other functions will be omitted.

The distance evaluation part 28 includes the restoration data generation part 23, a distance calculation part 24a, and a diversion determination part 29. The restoration data generation part 23 generates the restoration data based on weights being read. The distance calculation part 24a calculates the distance between the restoration data and each of the diversion destination training data, and the distance between the restoration data and each of the reference data. The diversion determination part 29 selects a neuron in which the shortest distance to the diversion source training data being read with respect to the restoration data is longer than or equal to the shortest distance to the reference data with respect to the restoration data and in which the shortest distance to the diversion destination training data with respect to the restoration data becomes minimum. The diversion determination part 29 determines that the weights of the synapses at layers lower than the selected neuron may be diverted. In this embodiment, the layers lower than the selected neuron are examples of permission levels, which are set by permitting the use of the weights of the synapses up to the specific layer, among the weights of the multiple layers.

[Learning and Risk Evaluation Process]

Figure 16:
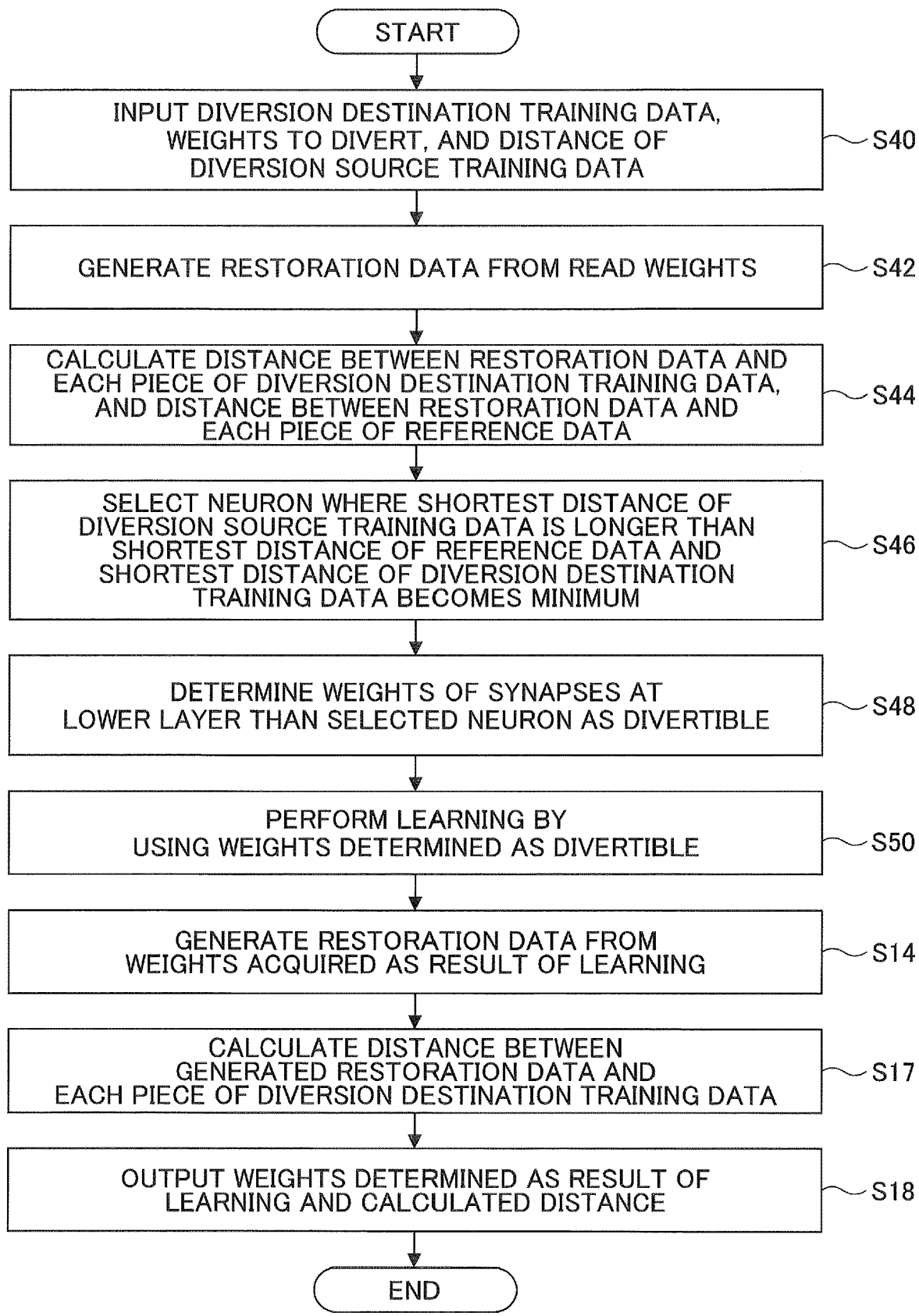
FIG. 16 is a diagram illustrating an example of the risk evaluation process at the learning of the diversion source according to the third embodiment.

Next, the learning and the risk evaluation process will be described with reference to FIG. 16, according to the third embodiment. FIG. 16 is a flowchart illustrating an example of the risk evaluation process at the learning with the diversion destination training data according to the third embodiment. The risk evaluation process at the learning with the diversion source training data according to the third embodiment is similar to the risk evaluation process at the learning with the diversion source training data according to the first embodiment illustrated in FIG. 8, and explanation will be omitted here.

When initiating the risk evaluation process at the learning with the diversion destination training data according to this embodiment, the input part 21 inputs the diversion destination training data, the weights to divert, and the distance of the diversion source training data (step S40). Next, the restoration data generation part 23 generates the restoration data based on the weights being read (step S42). When generating the restoration data, the restoration data generation part 23 acquires input data increasing the activity level of the neuron 10 being focused by the method of Non-Patent Document 2, for instance, and sets the input data as the restoration data.

Next, the distance calculation part 24a calculates the distance between the restoration data and each piece of the diversion destination training data, and calculates the distance between the restoration data and each piece of the reference data (step S44).

Next, the diversion determination part 29 selects a neuron, in which the shortest distance to the diversion source training data with respect to the restoration data is greater than or equal to the shortest distance to the reference data with respect to the restoration data and in which the shortest distance to the diversion destination training data becomes minimum (step S46). The diversion determination part 29 determines that weights of the synapses at the layers lower than the selected neuron may be diverted (step S48). Next, the learning part 22 conducts the learning by using the weights determined to be diverted (step S50).

The restoration data generation part 23 generates the restoration data based on the weight acquired as a result of the learning (step S14). The distance calculation part 24b calculates the distance between the generated restoration data and each piece of the diversion destination training data (step S17). The output part 25 outputs the weights acquired as the result of the learning and the calculated distances (step S18), and terminates this process.

As described above, by the learning machine 2 according to the third embodiment, at the learning with the diversion destination training data, the distance evaluation part 28 generates the restoration data based on weights being read. Next, the learning machine 2 selects a neuron, in which the shortest distance between the restoration data and the diversion source training data is greater than or equal to the shortest distance between the restoration data and the reference data and in which the shortest distance of the diversion destination training data with respect to the restoration data becomes minimum, and determines that weights of the synapses at layers lower than the neuron may be diverted. In the deep learning, at the lower layer the neurons are more general, and at the upper layer the neurons become more task-specialized factors. Accordingly, by selecting a neuron in which the diversion effect is expected to have the most diversion effect among the lower layers that satisfy diversion safety, it is possible to determine the diversion allowance range in consideration with the safety of the diversion and the diversion effect. By this determination, it is possible to conduct the learning at high speed and with high accuracy by using a result of the learning at the learning with the diversion source training data, and it is also possible to conduct the learning compatible with the safety of the diversion and the diversion effect.

(Hardware Configuration)

Figure 17:
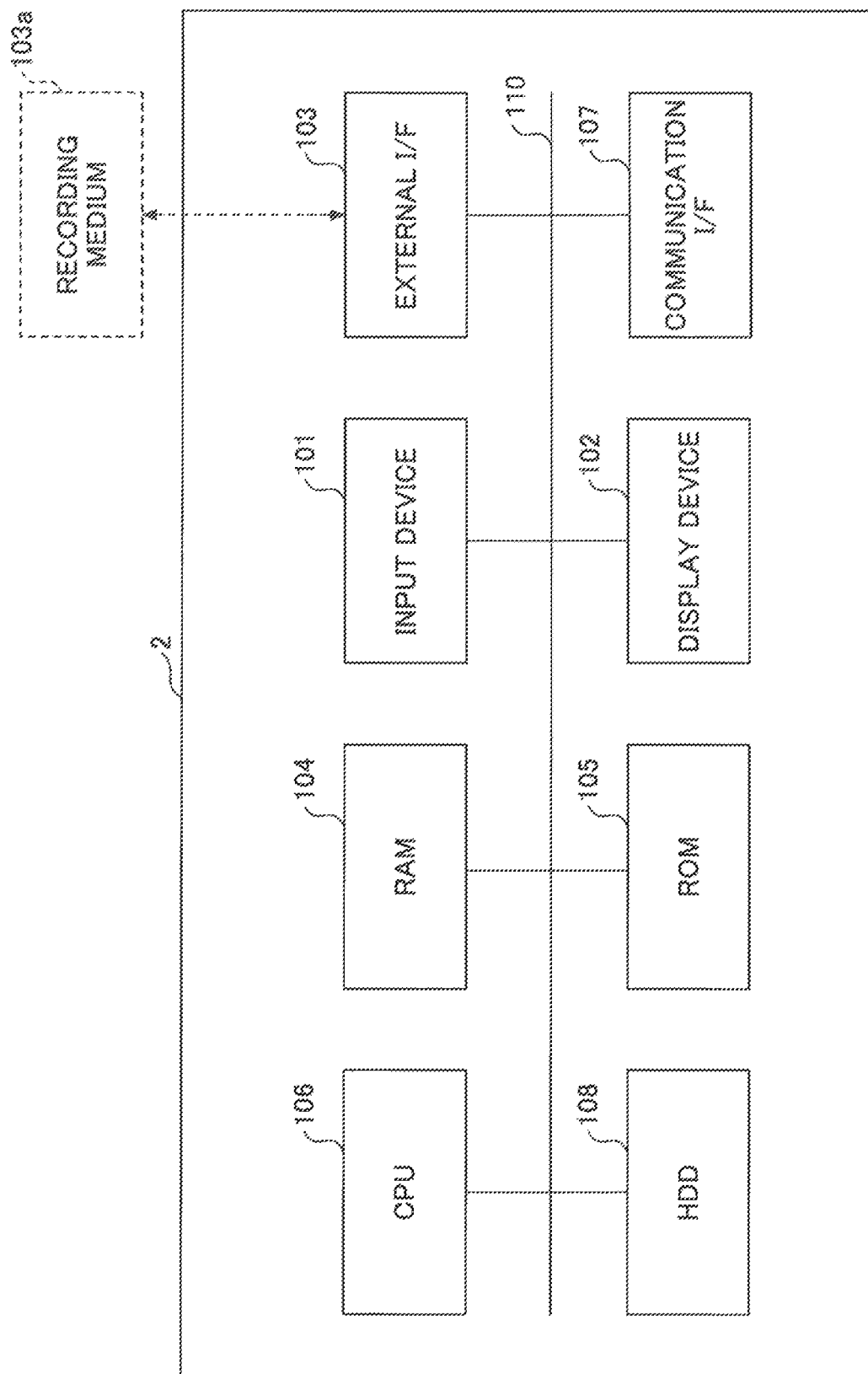
FIG. 17 is a diagram illustrating an example of a hardware configuration of the learning machine according to the first to third embodiments.

Finally, a hardware configuration of the learning machine 2 will be described with reference to FIG. 17. FIG. 17 illustrates an example of the hardware configuration of the learning machine 2 according to this embodiment. The learning machine 2 includes an input device 101, a display device 102, an external I/F 103, and a RAM (Random Access Memory) 104, a ROM (Read Only Memory) 105, a CPU (Central Processing Unit) 106, a communication I/F 107, an HDD (Hard Disk Drive) 108, and the like, each mutually connected through a bus 110.

The input device 101 includes a keyboard, a mouse, and the like, and is used to input each of operation signals to the learning machine 2. The display device 102 includes a display, and displays various process results. The communication I/F 107 is an interface for connecting the learning machine 2 to a network. By this interface, the learning machine 2 is able to conduct data communication with another device (for instance, a device of the customer or the like) through the communication I/F 107.

The HDD 108 is a non-volatile storage device, which stores programs and data. The programs and the data being stored may include basic software for controlling the entire learning machine 2 and application software. For instance, the HDD 108 may store the reference data DB 27*a*, programs such as the control program 70, the risk evaluation program 71, and the like.

The external I/F 103 is an interface with an external device. The external device may be a recording medium 103*a*, or the like. Thus, the learning machine 2 is able to read from and/or write to the recording medium 103*a* through the external I/F 103. The recording medium 103*a* may be a CD (Compact Disk), a DVD (Digital Versatile Disk), a SD memory card (Secured Digital Memory card), a USB memory (Universal Serial Bus memory), or the like.

The ROM 105 is a non-volatile semiconductor memory (storage device), which retains internal data even when power is turned off. The ROM 105 may store programs and data for network settings and the like. The RAM 104 is a volatile semiconductor memory (storage device), which temporarily retains programs and data. The CPU 106 is a central processing unit for realizing control of the entire apparatus and implemented functions, by reading out the control program 70, the risk evaluation program 71, and data from the storage device (for instance, "HDD 108", "ROM 105", or the like) to the RAM 104, and performing processes.

By the above described configuration, in the learning machine 2 according to this embodiment, the CPU 106 performs the learning and the risk evaluation process by using the data, the control program 70, and the risk evaluation program 71 stored in the ROM 105 or the HDD 108. Information to be stored in the reference data DB 27*a* may be stored in the RAM 104, the HDD 108, or a server on a cloud via the network, and necessary information may be sent to the learning machine 2. Each of the learning part 22, the restoration data generation part 23, and distance calculation parts 24, 24*a*, and 24*b* is realized by processes which the control program 70 causes the CPU 106 to execute. Each of the permission determination part 26 and the diversion determination part 29 is realized by processes which the risk evaluation program 71 causes the CPU 106 to execute. For instance, the input part 21 is realized by the input device 101. For instance, the output part 25 is realized by the display device 102.

The evaluation method, the evaluation program, and the information processing apparatus are described above with reference to the embodiments; however, the evaluation method, the evaluation program, and the information processing apparatus according to the present invention are not limited to the above embodiments, and various variations and modifications may be made without departing from the spirit and scope of the present invention. Moreover, if there are a plurality of embodiments and variation examples, they may be combined as long as a contradiction does not occur.

For instance, each of the configurations of the risk evaluation method, the risk evaluation program, and the information processing apparatus is an example, and does not limit the spirit and scope of the present invention. Various system configurations may be exemplified depending on uses and purposes.

According to one aspect, it is possible to quantitatively evaluate safety of diversion of a learning result and a diversion effect.

All examples and conditional language recited herein are intended for pedagogical purposes to aid the reader in understanding the invention and the concepts contributed by the inventors to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A risk evaluation method performed by a computer, the method comprising: conducting machine learning of a neural network by inputting training data into the neural network, so that the neural network has a plurality of trained weights in a plurality of layers after the machine learning; calculating restoration data by using only a part but not all of the trained weights, the restoration data being a restored version of the training data, the part of the trained weights being situated in part but not all of the plurality of layers; and calculating, based on a data distance between the restoration data and the training data, a risk that the training data are restored from the part of the trained weights in transfer learning.

2. The risk evaluation method as claimed in claim 1, further comprising:
setting a permission level by permitting use of weights up to a specific layer among the plurality of trained weights at the plurality of layers, the part of the trained weights corresponding to the permission level.

3. The risk evaluation method as claimed in claim 1, wherein the data distance is calculated by using data, in which the training data are converted by weights up to a specific layer among the plurality of weights of the plurality of layers, and the restoration data.

4. The risk evaluation method as claimed in claim 1, wherein a permission level is determined based on the data distance, upon conducting the machine learning, the permission level indicating permission to use some of the trained weights up to a specific layer.

5. The risk evaluation method as claimed in claim 1, further comprising:
determining whether to permit a transfer learning using the part of the trained weights based on the data distance, upon performing the transfer learning conducting the machine learning using the weights corresponding to a permission level.

6. A non-transitory computer-readable storage medium having stored therein a risk evaluation program that causes a computer to execute a process comprising: conducting machine learning of a neural network by inputting training data into the neural network, so that the neural network has a plurality of trained weights in a plurality of layers after the machine learning; calculating restoration data by using only a part but not all of the trained weights, the restoration data being a restored version of the training data, the part of the trained weights being situated in part but not all of the plurality of layers; and calculating based on a data distance between the restoration data and the training data, a risk that the training data are restored from the part of the trained weights in transfer learning.

7. The non-transitory computer-readable storage medium as claimed in claim 6, wherein the process further comprises:
setting a permission level by permitting use of the weights up to a specific layer among the plurality of trained weights at the plurality of layers, the part of the trained weights corresponding to the permission level.

8. The non-transitory computer-readable storage medium as claimed in claim 6, wherein the data distance is calculated by using data, in which the training data are converted by weights up to a specific layer among the plurality of weights of the plurality of layers, and the restoration data.

9. The non-transitory computer-readable storage medium as claimed in claim 6, wherein a permission level is determined based on the data distance, upon conducting the machine learning, the permission level indicating permission to use some of the trained weights up to a specific layer.

10. The non-transitory computer-readable storage medium as claimed in claim 6, wherein the process further comprises:
determining whether to permit a transfer learning using the part of the trained weights based on the data distance, upon performing the transfer learning conducting the machine learning using the weights corresponding to the permission level.

11. An information processing apparatus comprising: a memory; and a processor coupled to the memory and the processor configured to: conduct machine learning of a neural network by inputting training data into the neural network, so that the neural network has a plurality of trained weights in a plurality of layers after the machine learning; calculate restoration data by using only a part but not all of the trained weights, the restoration data being a restored version of the training data, the part of the trained weights being situated in part but not all of the plurality of layers; and calculate, based on a data distance between the restoration data and the training data, a risk that the training data are restored from the part of the trained weights in transfer learning.

12. The information processing apparatus as claimed in claim 11, the processor further being configured to:
set a permission level by permitting use of the weights up to a specific layer among the plurality of weights at the plurality of layers, the part of the trained weights corresponding to the permission level.

13. The information processing apparatus as claimed in claim 11, wherein the processor calculates the data distance by using data, in which the training data are converted by weights up to a specific layer among the plurality of weights of the plurality of layers, and the restoration data.

14. The information processing apparatus as claimed in claim 11, wherein the processor determines a permission level based on the data distance, upon conducting the machine learning, the permission level indicating permission to use some of the trained weights up to a specific layer.

15. The information processing apparatus as claimed in claim 11, the processor further being configured to:
determining whether to permit a transfer learning using the part of the trained weights based on the data distance, upon performing the transfer learning conducting the machine learning using the weights corresponding to a permission level.

\* \* \* \* \*